United States Patent [19]
Lacoste-Bourgeacq et al.

[11] Patent Number: 6,042,853
[45] Date of Patent: Mar. 28, 2000

[54] METHOD FOR REMOVING CELLULOSIC CASINGS FROM SAUSAGES

[75] Inventors: Jean-Francois Lacoste-Bourgeacq, Hinsdale; Skeeter Meranda Bassue-Hyligar, Chicago Heights; Roger Aceto, Naperville, all of Ill.

[73] Assignee: Viskase Corporation, Chicago, Ill.

[21] Appl. No.: 09/141,754

[22] Filed: Aug. 28, 1998

[51] Int. Cl.⁷ .............................. A22C 13/00; A23L 1/317

[52] U.S. Cl. .............................. 426/57; 426/105; 426/135

[58] Field of Search .............................. 426/57, 105, 135; 428/34.8

[56] References Cited

U.S. PATENT DOCUMENTS 5,914,141  6/1999  Stall et al. ................................ 426/105

FOREIGN PATENT DOCUMENTS 0 718 406 A1  6/1996  European Pat. Off. .
19 628 232 A1  1/1998  Germany .

*Primary Examiner*—Arthur L. Corbin
*Attorney, Agent, or Firm*—Roger Aceto

[57] ABSTRACT

The removal of a cellulosic casing from about a sausage stuffed and processed in the casing is accomplished by contacting the sausage with a cellulase or cellulase enzyme complex to metabolize the cellulosic casing on the sausage thereby producing a substantially casing-free sausage.

20 Claims, 1 Drawing Sheet

METHOD FOR REMOVING CELLULOSIC CASINGS FROM SAUSAGES

FIELD OF THE INVENTION

The present invention relates to a method for removing casings from sausages and, in particular, for removing cellulosic casings from sausages such as frankfurters and the like.

BACKGROUND OF THE INVENTION

It is well known that certain types of sausages such as frankfurters, are made on automatic stuffing machines. These machines stuff an uncooked sausage emulsion into a long tubular casing while simultaneously forming the casing into links. Typically, the casing is of a regenerated cellulosic and the individual links are formed by twisting the casing during stuffing. The individual links also may be formed by pinching the stuffed casing. In any event, the result is a string of links that may be up to 50 meters or more long. The string is processed to cook or cure the emulsion and then the casing is removed to produce individual sausages ready for retail packaging. Casings for use in making linked sausages generally are made of a pure regenerated cellulose and are produced in sizes which range from about 14.5 to 45 mm in diameter.

Peeling the cellulose casing from the sausages has presented particular problems to the art. In this respect, peeling aid solutions have been developed. These peeling aid solutions are applied to the inner wall of the casing by the casing manufacturer. Generally the solutions include compounds that create an aqueous film between the surface of the sausage and the casing. This film reduces the adhesion of the casing to the surface of the sausage and thus facilitates the peeling of the casing from the sausage. The effect of such peeling aids varies depending upon the particular formulation of the emulsion being stuffed and the processing conditions. Accordingly, it is not unusual for casing manufacturers to offer several different peeling treatments to accommodate the particular needs of its customers. The application of a peeling solution to the interior of the cellulose casing also requires additional materials and manufacturing steps that add to the casing cost.

A typical method used by the sausage maker to remove the cellulose casing from the sausages is to run the string of links through a mechanical peeler. The peeler has a knife edge that longitudinally slits the casing. The string then passes over a perforated wheel connected to a vacuum source. The vacuum pulls the casing around the wheel and away from the sausages while the sausages are allowed to pass tangentially off the wheel. This separates the casing and frees the individual sausage links. The peeling apparatus also commonly exposes the string of sausages to steam to help loosen the casing from the sausage and facilitate peeling. Mechanical peelers of this type are shown in U.S. Pat. Nos. 3,698,973; 4,118,828; and U.S. Pat. No. 4,414,707 among others.

Mechanical peelers while comprising the present preferred method for peeling sausages, have several drawbacks. For example, the knife edge becomes dull and must be replaced periodically. If the knife edge is improperly positioned, it either will not cut through the casing or it may cut too deeply and score the sausage. If the casing is not cut, it can not be separated from the sausage. Thus, the knife edge must be critically controlled for bearing pressure and placement with respect to the casing surface in order to properly slit the casing without deeply scoring the surface of the sausage. The use of steam also is an objectionable part of the process even though it often is necessary for high percentage peeling. Use of steam results in high utility costs. The steam condenses and the free-standing water which results makes for an unsafe work environment. Also, the condensed steam collects on the peeled sausages and is a source of contamination. The problems caused by condensation is particularly acute if the steam peeling is conducted in a refrigerated environment.

Mechanical peelers and the use of casing treatments are not 100% effective. Often shards or bigger sections of casing remain on the peeled link that must be removed manually. Casing manufactures often add color or stripes to the cellulose casing to facilitate spotting the casing piece on the peeled sausage. These stripes or colors further add to the casing cost.

Disposal of the spent casing after removal from the sausages is another problem for the sausage manufacturer. Typically the spent casing is sent to a land fill. This is costly in terms of hauling and landfill charges.

In view of the drawbacks of methods currently in use for peeling cellulose casings from sausages, the need exists for an improved method for removing the casing from frankfurters that does not depend upon either chemical treatments applied to the inner surface of the casing or upon contact of the processed sausage with steam to facilitate the separation of the cellulose casing from the sausage. The need further exists for a method that eliminates the need for mechanical peelers to remove a cellulose casing from the sausages.

Accordingly, one object of the present invention is to provide an improved method for removing cellulose casings from sausages.

Another object of the present invention is to provide a method for removing cellulose casing from sausages that avoids the need for applying a product-specific easy peeling chemical treatment to the inner surface of the casing.

A further object of the present invention is to eliminate the use of mechanical peelers and steam assisted peeling to remove cellulose casings from frankfurter sausages and the like.

Yet another object is to provide a method of removing cellulose casing from sausages that eliminates the need for land filling the spent casing.

SUMMARY OF THE INVENTION

The present invention is a method of removing a cellulosic food casing from about a stuffed sausage by action of food grade enzymes or enzymes which are generally recognized as safe (GRAS), and which have the ability to hydrolyze cellulose and hemicellulose. This can be accomplished by contacting the string of processed sausages with a solution containing the enzyme or enzyme blend such as by showering the string or passing it through a tank containing the solution. Enzymes particularly suited to metabolize a cellulose casing include cellulase and xylanase. It has been found that a few hours in contact with a solution containing the appropriate enzyme or enzyme blend is sufficient to permit the enzyme to metabolize the cellulose casing so as to rid the sausage of its casing.

It is not necessary for purposes of the present invention to have the cellulose casing completely metabolized by the enzyme in order to remove the casing from the sausage. It is sufficient that the enzyme degrade the casing to the point where either the sausage and casing can be separated or casing pieces remaining on the sausage can be removed by rinsing.

The sausages, once they are rid of the casing, are considered to be "skinless". They are then collected from the solution and packaged for the retail trade. If necessary, the skinless sausages are rinsed prior to packaging. The solution which remains after the skinless sausages are collected contains the by-products of metabolizing the cellulose including glucose, xylose, cellobiose, and other oligosaccharides. The solution may also contain bits of cellulose if the metabolism has not gone to completion. This solution either is discharged to the sewer, processed to recover the glucose and other by-products, or is processed for use as an animal feed. Preferably, processing of the solution includes recovery of the enzyme for reuse.

Accordingly, the method of using an enzyme to metabolize the cellulose food casing on the sausage addresses and resolves the problems associated with applying product-specific easy peel treatments to the casing interior, mechanically peeling the casing and dealing with the spent casing after peeling.

Several enzymes that have been found suitable are MULTIFECT™ CL, MULTIFECT™ GC, and MULTIFECT™ XL all sold by Genencor Corporation of Rochester, N.Y. These enzyme formulations are GRAS and are derived from selected strains of *Trichoderma longibrachiatum* (formerly *Trichoderma reesei*).

At present, the only commercial process for manufacture of a cellulose casing involves use of the well-known viscose process. In the viscose process a natural cellulose is contacted with a strong base to produce alkali cellulose. The alkali cellulose then is reacted with other chemicals to produce cellulose xanthate, a soluble cellulose derivative. The xanthate is extruded as a tube into an acid bath. The acid reacts with the xanthate to regenerate the cellulose. Thus, with the viscose process, there is a first chemical reaction to create a soluble cellulose derivative and a second chemical reaction to regenerate the cellulose from the derivative.

More recently, a solution process has been adapted to the production of cellulose casing. In a solution process a cellulose casing is formed by a method involving the direct dissolution of a natural cellulose, such as wood pulp, by a cellulose solvent, such as N-methyl-morpholine-N-oxide (NMMO). The solution is extruded as a tube into a bath of a non cellulose solvent, such as water, to extract the solvent and precipitate or regenerate the cellulose. Thus when using a solution process, a non derivitized cellulose casing is formed in contrast with a derivitized cellulose casing formed using a process such as the viscose process. Reference is made to U.S. Pat. Nos. 5,277,857 and 5,451,364 for more details of a method for forming a casing of a non derivitized cellulose. For purposes of the present invention a "non derivitized" cellulose means a cellulose which has not been subjected to covalent bonding with a solvent or reagent but which has been dissolved by association with a solvent or reagent through Van der Waals forces and/or hydrogen bonding.

Unexpectedly, it has been found that the enzyme is more effective against a non derivitized cellulose casing than against a derivitized cellulose casing. It is not understood why the enzyme metabolizes a casing of non derivitized cellulose faster than a casing of a derivitized cellulose. One possible reason is that the derivitized cellulose may contain trace amounts of a sulfur compound that may inhibit enzyme activity. These sulfur compounds commonly evolve during the chemical reaction for regenerating the derivitized cellulose. U.S. Pat. No. 5,702,783, discloses that the crystalline structure of non derivitized cellulose casing is different from the crystalline structure of a casing of derivitized cellulose. This difference in crystalline structure may be the reason why the non derivitized cellulose is more susceptible to enzymatic metabolism.

For what ever the reason, it has been found that non derivitized cellulose is more susceptible to enzyme action than is a derivitized cellulose. For example, a non derivitized cellulose casing is opened by enzyme action in as short a time as 0.5 hours and is made completely soluble by the enzyme in as short a time as five hours. In contrast, a derivitized cellulose casing takes longer to be opened by enzyme action and is made completely soluble in 5.5 to 7.0 hours. Thus, a preferred embodiment of the invention involves the use of a non derivitized cellulose casing to make the sausages.

Accordingly, the present invention may by characterized in one aspect thereof be a method for removing a cellulose casing from sausages such as frankfurters and the like comprising contacting the encased sausage with a solution containing a food approved enzyme under conditions permitting the enzyme to metabolize an amount of casing sufficient to degrade the casing to such an extent that the casing separates from the sausage thereby producing a substantially casing-free sausage.

DESCRIPTION OF THE DRAWINGS

The sole FIGURE is a schematic representation showing apparatus for carrying out the method of the present invention.

DETAILED DESCRIPTION OF THE INVENTION

Figure 1:
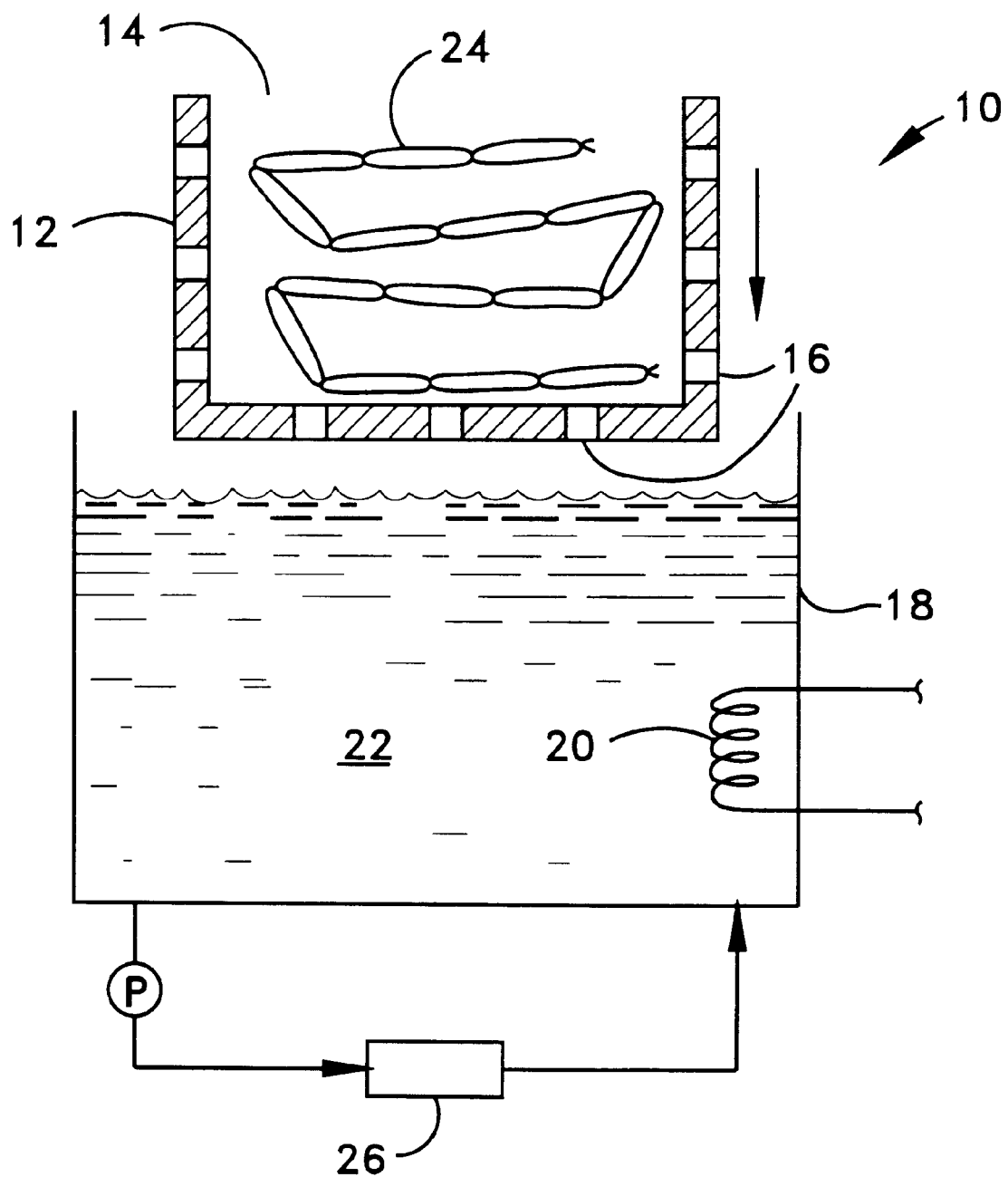

Referring to the drawing, apparatus for caring out the method of the present invention is generally indicated at 10. The apparatus includes container 12 that is open at its upper end 14. The bottom and side walls of the container each have a plurality of openings 16. Container 12 is arranged for movement into and out of a vat 18. The vat preferably is provided with a temperature control means 20 and contains a solution 22 that includes a food approved enzyme or enzyme blend capable of metabolizing cellulose and/or hemicellulose.

In operation, a string of frankfurters 24 is placed into the container 12. The frankfurter string consists of cooked frankfurters encased in a cellulose food casing. Preferably, the frankfurters are fresh from the processing operation that has cooked the emulsion stuffed into the cellulose casing. As an alternative, the string may be divided by cutting the connective casing between the frankfurters so the cellulose encased frankfurters of the string are separated one from another.

The container 12 is lowered into the vat. The openings 16 allow the enzyme-containing solution 22 in the vat to enter and fill the container. The container is kept in the vat for a time sufficient to permit the enzyme to metabolize the cellulose casing on the frankfurter. If desired, means (not shown) may be provided to force the circulation of the enzyme-containing solution through the container. The frankfurters can remain in contact with the enzyme until the cellulose is fully metabolized. However, as metabolism progresses, the casing is degraded to such an extent that pieces and flecks of casing are easily washed or otherwise removed from the frankfurter. Accordingly, the complete removal of the casing from the frankfurter does not depend on fully metabolizing the casing.

After the cellulose has been metabolized, the container is lifted from the vat. The enzyme-containing solution drains from the openings 16 and back into the vat as the container is lifted. In this fashion the frankfurters, now casing-free, are recovered from the solution. They are then removed from the container, rinsed if necessary to remove any residual casing bits and then passed on for retail packaging.

The solution that remains in the vat is glucose rich as a result of the metabolism of the cellulose by the enzyme and likely contains flecks of casing as well as other metabolism by-products such as monosaccharides (xylose) and oligosaccharides. This solution can be further processed to concentrate or recover the glucose and other by-products for other uses, such as for example, use as an animal feed. Enzymes also can be recovered from the solution for reuse.

It is known that by-products of the cellulose digestion such as glucose, may inhibit the action of the enzyme. Accordingly, to maintain enzyme activity, the enzyme-containing solution 22 as it becomes contaminated by the by-products of the cellulose metabolism, may be circulated through an ultra filtration unit indicated at 26. In the ultra filtration unit, the glucose and other by-products such as oligosaccharides are removed and then the filtered, enzyme -containing solution is returned to the vat 18.

It has been found that the area of the cellulose casing that undergoes the fastest metabolism by the cellulase is along a seam in the casing believed to be the extrusion fold. The extrusion fold is a longitudinal fold produced during the manufacture of the casing. The fold occurs as the casing, in a gel state, is laid flat and passed between nip rollers prior to drying. The cellulose casing is probably weakest along the extrusion fold which may account for the faster metabolism in this area.

The metabolism of the casing by the enzyme first opens a seam along the extrusion fold. At this point the casing is not completely removed from the casing. However, while it is preferred to allow the enzyme to completely metabolize the casing, the opening of a seam does provide an opportunity to shorten the cycle time of the process. In this respect rather than wait until all of the cellulose casing has been metabolized, the frankfurters can be removed from the container 12 when the seam is opened in the casing. Either the opened casing will drop from the sausages or a pressure wash can be used to remove the casing from about the sausages.

Several tests were conducted to demonstrate the method of the present invention. A first test was conducted for screening purposes to determine the optimal conditions for the enzyme. In the test, spent casing of a conventional derivitized cellulose was exposed to various concentrations of an enzyme active against cellulose. The spent derivitized cellulose casing consisted of NOJAX® cellulose casing made by Viskase Corporation recovered from a conventional mechanical peeling machine. In the screening tests, the enzyme used was a MULTIFECT™ CL enzyme sold by Genencor International, Inc. According to the manufacturer, this enzyme is generally recognized as safe (GRAS). It is a fungal cellulase derived from a selected strain of *Trichoderma reesei* and its activity is standardized on the basis of its ability to metabolize carboxymethylcellulose (CMC) to glucose. The minimum CMC activity of this enzyme is represented as being 2,000 IU/ml wherein one IU (International Unit) of activity liberates 1 $\mu$mole of reducing sugar (glucose equivalent) in one minute at 50° C. and pH of 4.8. The enzyme is said to degrade crystalline or amorphous cellulose.

In the screening test, three enzyme solution samples were prepared by adding 0.25 gm/liter, 0.5 gm/liter and 2 gm/liter respectively of the enzyme to 100 grams of a pH 5 buffer solution at a temperature of about 50° C. Six samples were prepared at each concentration giving a total of 18 samples. The spent casing was not washed to remove any fats or oils remaining on the inner surface of the casing after peeling. However, the spent casing was dried in order to more accurately measure the amount of cellulose being used in the test.

Ten grams of the dried spent cellulose casing were added to each sample. After different time intervals samples were centrifuged for thirty no minutes at 3000 RPM to recover solids. The solids were weighed and ten grams of the remaining liquid fraction from each sample were analyzed for glucose content. Glucose is not the sole by-product of the metabolism of the cellulose by the enzyme. As noted above, other compounds such as xylose and oligosaccharides are produced. However, the amount of glucose is a convenient indicator of the efficiency of the enzyme to metabolize the cellulose.

After about three hours in the highest concentration solution of 2.0 gm/liter, the solids content of the original 10 gm sample was reduced by 2 gm and the glucose content of the liquid fraction increased to 1704 ppm, which translates to 1.7% of the dry casing as being converted to glucose. After 28 hours the solids content was reduced to about 6 gm with the glucose content increasing to about 8305 ppm. This means that about 8.31% of the dry casing was converted to glucose. While reducing the solids content by almost one-half over a period of 28 hours is significant, it is not an indication that enzyme action could function as a peeling mechanism.

Similar tests conducted at a pH of 5.6 produced results not as good as those conducted at a pH 5. Other tests conducted at pH 5 and at temperatures of 400 and 60° C. were not as good as those conducted at 50° C.

The screening indicated that the enzyme appeared to be most effective against the cellulose casing at a temperature of 50° C. and a pH of 5. Accordingly, further tests were conducted under these conditions.

The enzyme concentration was raised to 20 gm/liter to increase the speed of the cellulose degradation by the enzyme. Five liter samples of a buffered (pH 5) solution were prepared, each containing a 20.0 gm/liter concentration of the MULTIFECT™ CL enzyme. One kilogram of frankfurters, comprising a string of about fifteen links was place in each of the five liters of solution. The solutions then were heated to a temperature of about 50° C. Frankfurters stuffed in casings of both derivitized and non derivitized cellulose casings were tested separately. The samples were observed over a period of about four hours and during this time, some metabolism of both casings was observed. The samples were left over night for a total time in the enzyme solution of about eighteen hours. By morning, the casing in both cases was completely metabolized and the individual sausages were casing-free. Glucose analysis showed that after eighteen hours, about 86% of the non-derivitized cellulose had been converted to glucose and 83.2% of the derivitized cellulose had been converted.

There are various reasons why the enzyme was slow to metabolize the spent casing in the screening test but successfully metabolized all of the casing (both the derivitized type and the non derivitized casing) in less than eighteen hours. One reason is the higher enzyme concentration. Another possible contributing factor is that the contact of the enzyme with the fats and oils from the spent casing interfered with the action of the enzyme. In the second test which used stuffed casing, the enzyme only could contact the outer surface of the casing which is relatively free of fats and oils.

Given the results of the second test, a third test was conducted in order to determine more precisely, the time taken to metabolize the samples. In the third test, the test conditions of the second test were repeated except that the samples were inspected at intervals of 10, 25, 50, 80, 140 and 170 minutes.

After ten and twenty-five minute intervals there appeared to be no visual change in either type of casing. After about fifty minutes, both types of casing appeared to tear more easily indicating a weakening of the cellulose structure by the enzyme. This weakening was most apparent along the extrusion fold.

After about 170 minutes, the non-derivitized casing was metabolized along the extrusion fold to such an extent that a seam had opened allowing easy removal of sausages from the casing. Metabolism of the extrusion fold of the derivitized cellulose casing was noticed but the casing was still intact and dio no seam had opened.

The test was allowed to continue. By five hours, a seam had opened in the derivitized cellulose casing allowing removal of some sausages from the casing. After about seven hours, almost all of the non derivitized cellulose casing had been metabolized leaving the individual sausages clean and free of casing, whereas the derivitized cellulose still was mostly intact about the sausages.

Based on these tests it is apparent that an enzyme having the ability to hydrolyze cellulose is effective for removing cellulose casing from a stuffed sausage such as a string of frankfurters. This is particularly the case when using a casing made with a non derivitized cellulose because the enzyme appears to attack and is able to metabolize a non derivitized cellulose casing much faster than a derivitized cellulose casing. Thus the use of an enzyme to remove casing from a string of stuffed sausages is a viable alternative to mechanical peeling.

An additional screening test using the conditions noted above, was conducted using MULTIFECT™ XL enzyme. MULTIFECT™XL is identified by the manufacturer to be a cellulase enzyme complex with endoxylanase activity. The enzyme is derived from a strain of *Trichoderma reesei* and is said to have minimum activity of 445 XAU where the XAU (Xylanase Activity Unit) is based on the release of Remazol Brilliant Blue-dyed oat spelt xylan at pH 4.5 at 40° C. in ten minutes using an endoxylanase reference standard.

The same spent NOJAX® casing was used in the tests with a solids and glucose analysis being made at intervals of 1, 2, 20, and 24 hours. At a pH of 5 and temperature of 50° C., the enzyme reduced the initial ten gram sample of casing to 6.6 grams in twenty hours and to 6.4 grams in twenty-four hours. However, glucose analysis showed that after 24 hours, 17.13% of the cellulase had been converted to glucose as opposed to an 8.31% conversion for the MULTIFECT™CL enzyme in twenty-eight hours (see above). Since cellulose casing is not known to contain a large percentage of xylan, the amount of glucose produced confirms that the XL enzyme does include a cellulase. From this screening, and based on the amount of cellulose converted to glucose, it is apparent that both types of enzymes (cellulase and xylanase), working together, are more effective in metabolizing the cellulose casing than a cellulase alone.

In another test, frankfurters in casings of both derivitized and non derivitized cellulose casings were exposed to different enzymes. In all cases the enzyme concentration was 20 gm/liter at pH 5 and 50° C. Two solutions were prepared, one containing the MULTIFECT™ XL and another containing a 50/50 blend of the MULTIFECT™ XL with MULTIFECT™ CL. Strings of ten frankfurters each (about 0.5 kilograms) were placed in beakers containing 2.5 liters of each buffered enzyme solution heated to 50° C. Periodically, visual observations were made to determine the extent of the cellulose degradation.

From a purely visual observation, there was little difference between the action of the XL alone and the XL/CL blend on the non derivitized cellulose casing. After 0.5 hours in the XL solution the casing was broken along a longitudinal seam. After 1.5 hours about 85% of the casing was gone and nine of the ten frankfurters were free of the casing. In this respect, enough of the casing was metabolized to permit the remaining casing to slip from the frankfurter and settle in the beaker. At 2.0 hours about 95% of the casing was solubilized. At 3.5 hours substantially all the casing was gone and at 5.0 hours no casing was seen. In the blend solution about 95% of the casing was solubilized after 2.0 hours.

The same general trend, albeit somewhat slower, was observed with the frankfurters stuffed into a derivitized cellulose casing and the XL/CL blend appeared to be slightly more effective based on visual observations, than the XL alone. Here, after 1.5 hours about 60% of the derivitized casing was solubilized by the XL/CL blend and some of the frankfurters had slipped from the casing. After 3.5 hours in the XL/CL blend solution and after 4.5 hours in the XL solution about 95% of the cellulose had been solubilized. No visible piece of the derivitized cellulose casing remained in either solution after 5.5 to 6 hours.

As compared with the previous tests using MULTIFLET™ CL alone, the XL enzyme containing a greater proportion of xylanase and the CL/XL blend both appeared to be the more effective agent to metabolize either types of cellulose casing.

Accordingly, it should be appreciated that the method of the present invention accomplishes its intended objects in providing an improved method for removing the cellulose casing from sausages such as frankfurters and the like. The use of an enzyme such as a cellulase or cellulase enzyme complex having xylanase activity can eliminate the need to apply special internal easy peeling coatings to the internal surface of the casing. It further eliminates the need for mechanical peelers and reduces utility costs by eliminating the use of steam in the peeling operation. The use of an enzyme or enzyme complex according to the present invention further eliminates the need to color the casing or provide the casing with stripes to highlight casing that may remain on the sausage after a mechanical peeling operation.

Although a preferred embodiment of the invention has been described in detail, it should be understood that modifications may be made without changing the spirit and scope of the invention as claimed. For example, since the enzyme is most active at a temperature of 50° C., it can be applied directly to the cellulose casing during the shirring of the casing. The enzyme then would remain relatively inactive until the casing is stuffed and processed to make the frankfurters. The moisture added by stuffing and an increase in temperature to 50° C. would activate the enzyme previously deposited on the cellulose casing to begin the metabolism of the casing.

Having described the invention in detail, what is claimed as new is:

1. A method for removing a cellulosic food casing from sausages comprising contacting a sausage encased in a cellulosic casing with a solution containing a food approved enzyme having the ability to hydrolyze cellulose under conditions permitting the enzyme to metabolize an amount of the cellulosic casing sufficient to degrade the casing to such an extent that the casing separates from the sausage, thereby producing a casing-free sausage.

2. A method as in claim 1 wherein the enzyme is selected from the group consisting of cellulase, xylanase, and mixtures thereof.

3. A method as set forth in claim 2 wherein the enzyme is derived from *Trichoderma longibrachiatum.*

4. A method as in clam 2 comprising maintaining the solution at a temperature of 40 to 60° C.

5. A method as in claim 2 comprising maintaining the solution at pH 5.

6. A method as in claim 2 wherein the concentration of the enzyme in the solution is about 2 to 20 gm/liter.

7. A method as in claim 2 wherein the enzyme is a cellulase having a carboxymethylcellulose activity level of at least 2,000 IU/ml.

8. A method as in claim 2 wherein the enzyme is a xylanase having an activity level of at least 445 xylanase activity units per milliliter.

9. A method as in claim 1 comprising maintaining the solution in contact with the encased sausage for a time sufficient for the enzyme to substantially completely metabolize the cellulose casing.

10. A method as in claim 1 comprising:
   a) maintaining the solution in contact with the encased sausage only for a time sufficient for the enzyme to open a longitudinal seam in the casing; and
   b) removing the sausage through the open seam.

11. A method as in claim 1 comprising maintaining the solution in contact with the cellulose casing on the sausage for not more than about 3.5 hours.

12. A method as in claim 1 wherein the cellulosic casing is selected from the group consisting of derivitized and non derivitized cellulose.

13. A method as in claim 1 wherein the cellulosic casing comprises a non derivitized cellulose.

14. A method for removing a cellulosic food casing from sausages stuffed and processed in the casing comprising:
   a) contacting the cellulosic casing with a solution containing a food approved enzyme;
   b) controlling the conditions of temperature and pH of the solution in a range that promotes activity of the enzyme;
   c) maintaining the solution in contact with the cellulosic casing for a time sufficient to metabolize the casing thereby producing a substantially casing-free sausage; and
   d) recovering casing-free sausage from the solution.

15. A method as in claim 14 wherein the enzyme is derived from *Trichoderma longibrachiatum.*

16. A method as in claim 14 comprising maintaining the solution at a temperature of 40 to 60° C.

17. A method as in claim 14 comprising maintaining the solution in contact with the cellulosic casing for not more than 3.5 hours.

18. A method as in claim 14 where in the cellulosic casing is formed of a non derivitized cellulose.

19. A method as in claim wherein the enzyme is selected from the group consisting of cellulase, xylanase, and mixtures thereof.

20. In a method including stuffing a food emulsion into a cellulosic casing and then processing the emulsion in the casing to produce sausage links encased in the cellulosic casing, an improved method for removing the cellulosic casing from the sausage to produce a casing-free sausage comprising contacting the encased sausage with a solution containing a food approved enzyme capable of metabolizing cellulose and maintaining the encased sausage in contact with the solution until a sufficient amount of the cellulose casing on the sausage has been metabolized to permit the remaining casing to slip from about the sausage.

* * * * *